United States Patent Office 3,124,494
Patented Mar. 10, 1964

---

3,124,494
AUTOGENOUS GAS-PRODUCING COMPOSITIONS CONTAINING POLYMERIC OXAZOLIDINONE AND A SOLID INORGANIC OXIDIZER
William F. Tousignant and Wilhelm E. Walles, Midland, Mich., assignors to The Dow Chemical Company, Midland, Mich., a corporation of Delaware
No Drawing. Filed Nov. 28, 1960, Ser. No. 71,889
6 Claims. (Cl. 149—19)

The present invention relates to new and useful compositions of matter and to the methods for their preparation. More particularly the present invention relates to new and useful temperature-stable, shock-stable, autogenetic gas-evolving compositions and methods for their preparation.

Many of the known autogenetic gas-evolving compositions of the present day are the result of mixing and blending rubbery organic materials with oxidizers. The attendant dangers of such mixing and blending are then unduly multiplied by the necessity of extruding, molding and compacting of the flammable mixture to obtain the material in shapes such as stars, cylinders and the like which are useful in generating the necessary gas patterns for propulsion units. The heat produced by such "working," the power requirements of equipment capable of such "working," and the instability of the materials being worked has contributed to and necessitated the development of expensive and tedious procedures to obtain even the simplest shapes. All of the inherent dangers attendant with the handling of explosive and combustible materials are present in these gas-evolving compositions and have been a contributing deterrent to commercial large scale low cost sources of this type of materials. It would therefore be advantageous to the art to have available a solid fuel-oxidizer autogenetic gas producing composition which needed no extensive or prolonged working; which in fact was stable well beyond the maximum temperature attained in any mixing or blending; which was liquid at room temperature during blending and therefore could be cast or poured into molds to shape; which has controlled water-solubility even when in the solid (cured) stage and which required little heat to solidify (polymerize).

The present invention provides just such an autogenetic gas-evolving, liquid pourable, temperature-stable, shock-stable, heat-curable, water-soluble composition. The advantages of such are readily apparent to those skilled in the art.

The new compositions can be characterized as inorganic oxidizers intimately bound with polymeric materials having the general formula

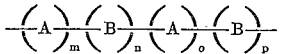

wherein A represents a monomeric or a recurring or repeating polymerized monomeric unit of a polymerizable material said monomeric unit having the general formula

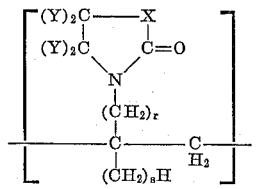

wherein X represents a member selected from the group consisting of —O—, —CH$_2$—, —O—CH$_2$—, and —CH$_2$O—; each Y is independently selected from the group consisting of hydrogen and a lower alkyl radical having from 1 to 4 carbon atoms inclusive; B represents A or a monomeric or recurring or repeating polymerized monomeric unit of a polymerizable material different than A; $r$ represents an integer from 0 to 2, inclusive; $s$ represents an integer rom 0 to 1, inclusive; and, $m$, $n$, $o$, and $p$ represent integers such as to provide a polymer which has a Fikentscher K-value of from 5 to 100. The Fikentscher K-value of a polymeric substance is a quantity, as defined by Fikentscher in Cellulosechemie, 13, 60 (1932), that represents an approximate measure of the weight fraction of a given sample of polymer in an infinitesimal molecular weight range. According to a concept that is widely acceptable to those skilled in the art, it may be in correlation, in an exponential manner, to the mean average molecular weight that obtains in a given sample of a polymeric substance. The K-value of a water-soluble polymer may be derived, in any given instance, by the formula:

$$\log Z = \frac{0.000075 K^2}{1+0.0015 K} + 0.001 K$$

wherein Z is the relative viscosity of a polymer solution at 1 percent by weight concentration in the solvent at any given temperature. For practical purposes, the same K-values for any given water-soluble polymer may be determined according to the equation in U.S. 2,811,449. The new compositions prepared from the polymeric materials described above and an oxidizer are combustible, self-contained autogenous evolvers of low-molecular weight gases having high thermal properties and thrust potential. These compositions are adaptable to be employed in ammunition and explosives as the "powder" or charge, and in power plants that convert thermal energy of a chemical reaction into high-energy streams of gas molecules. Thus, for example, the composition of the present invention can be used as the propellant in fixed ammunition or in bag-type ammunition. Further, the compositions can be employed as propellants in rockets, jet-assisted-take-offs of airplanes, long-range or short-range missiles and in supersonic missiles, anti-aircraft missiles and in intermediate or short-range rockets, such as those fired from bazookas, and the like.

It has now been found that the composition comprising an inorganic oxidizer and as a fuel-binder a water-soluble polymeric product of the class consisting of homopolymers and copolymers of at least one monomer selected from the group of those having the general formulae:

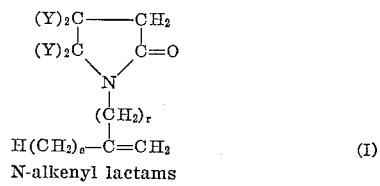
N-alkenyl lactams (I)

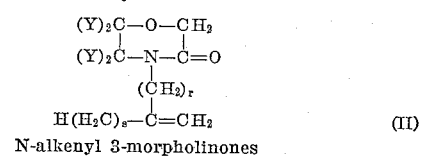
N-alkenyl 3-morpholinones (II)

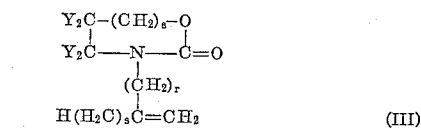
N-alkenyl-2-oxazolidinones and N-alkenyl-2-oxazinidinones (III)

wherein each X, Y, $r$ and $s$ has the aforedescribed value, intimately admixed to form a paste-like mixture capable of being poured, extruded or shaped, can be polymerized with heat to retain this shape and produce a solid or semi-solid, heat-stable, shock-stable, autogenously combustible, low-molecular-weight-gas-producing, polymer-oxidizer composition. Thus, from the foregoing, it becomes apparent that a water-soluble polymeric fuel-binder can be prepared by homopolymerizing a single species of one of the subgenera, represented by the Formulae I, II and III, above, or by copolymerizing two or more species from the same or different subgenera. It is also to be understood that one or more of the monomers can be copolymerized with substantially any other ethylenically unsaturated polymerizable monomeric material. The latter material can be employed in varying amounts depending upon its water-solubility and it has been found that generally up to about 10 percent by weight of such material can be included in the polymeric material without impairing the usefulness of the ultimate polymeric composition. It is not to be inferred, however, that when the different ethylenically unsaturated material is water-soluble per se that more than 10 percent by weight of such cannot be employed. The polymerization of the monomeric mixture takes place readily at temperatures of from about 35° C. to about 200° C. The amount of oxidizer in the composition is widely variable since some gas production will occur when the polymeric composition is ignited even when it contains little oxidizer. Thus one can employ as little as 5 percent by weight of oxidizer or as much as 90 percent by weight of oxidizer based on the ultimate composition. However, it is preferable to have from about 10 to 50 percent by weight of the inorganic oxidizer in the ultimate composition.

It is to be understood that other solid fuels, that is combustible materials which burn in a controllable manner such as the solid carbonaceous fuels as well as the inorganic fuels can be employed. By solid carbonaceous fuels we mean carbon-containing materials capable of oxidation can be employed as well as solid organic materials containing surfur, oxygen and the like, such as Thiokol rubbers (Thiokol D, Thiokol 40, Thiokol A) and the like, if the end use requires somewhat higher heats of combustion. The inorganic fuels such as the alkaline earth metal hydrides as well as the boron hydrides can be used alone or in combination with the organic carbonaceous fuels. The monomer-oxidizer compositions of the present invention are compatible with most solid fuel material and the presence of such fuels does not materially affect the technique of polymerization of the binder-fuel or reduce the rigidity of the ultimate polymeric composition containing the oxidizer.

The monomer or monomers can be copolymerized with substantially other ethylenically unsaturated polymerizable materials. Representative of such materials (fuels) are the alkenyl aromatic hydrocarbons of the benzene series for example, such as styrene, divinylbenzene, the isopropenyl benzenes, ethyl vinyl benzenes, the isopropenyl toluenes, vinyltoluenes and the like; and the alkenyl halides such as vinyl chloride, isopropenyl chloride and the like; and the acrylic acids and esters thereof and the like, to alter the physical and chemical properties of the aromatic polymer for a particular application. Further Si containing monomers which burn yet give a $SiO_2$ matrix which helps retain the shape of the burning solid fuel can also be copolymerized in the usual manner. Exemplary of materials of this class are those taught in our copending application Serial No. 791,279 and filed February 5, 1959, now abandoned. It is to be understood that when the more insoluble ethylenically unsaturated materials above described are employed, usually no more than 10 percent by weight of the comonomer is employed if the water solubility of the polymerized product is to be retained.

In carrying out the present invention, the monomer described above and represented by the Formulae I, II or III, alone or in admixture with the comonomer of the series represented by the Formulae I, II and III and/or an ethylenically unsaturated polymerizable monomer of a different series, is mixed with a solid inorganic oxidizing compound, such as, for example, boron hydride, a solid peroxide, a nitrate or perchlorate of ammonia or a nitrate or perchlorate of an alkali metal or the like. The resulting mixture can be adjusted so as to form a slurry for casting or a viscous mixture capable of extrusion. The mixture prior to polymerization is thus shaped and then heated at a temperature of from about 35° to about 200° C. to polymerize the polymerizable materials. The monomeric materials are employed in an amount of from 5 to 90 percent, by weight, based on the ultimate composition and preferable from 50 to 90 percent by weight. In any event the polymer-oxidizer material, either solid, soft plastic, mass or slurry, is usually stable to heat and light up to about 300° C. without explosion. The new polymer-oxidizer compositions can in some instances be remelted or softened and reformed without exploding. The polymeric material burns, on ignition, at an even, slow rate when the percent organic polymer is high and at a fast, spurty rate when the percent organic polymer is low. The polymeric materials are in many instances water-soluble and can be dissolved in water to impregnate wettable materials or, in case of accident or disposal even those of sparing solubility, can be flushed with water, thus providing a safe, easily handleable material.

The inorganic oxidizers which can be employed in accordance with the present invention are the solid peroxides, nitrates and perchlorates of ammonia or the alkali metals. Thus, for example, one can employ ammonium nitrate, ammonium perchlorate, potassium perchlorate, sodium perchlorate, sodium nitrate, potassium nitrate, lithium nitrate, sodium peroxide, potassium peroxide and the like as well as mixtures of these with, for example, magnesium hydride, boron hydride and the like.

The following examples illustrate the present invention but are not to be construed as limiting.

*Examples 1–10*

Polymerization of the below-listed materials was carried out at the temperatures indicated without explosion to obtain a product which could be burned to produce large volumes of gaseous products. The burning characteristics were determined by saturating a length of cotton string with an aqueous solution of the polymer product; drying; and igniting.

| Ex. No. | Monomer, Gm. | Salt (0.1 Gm.) | Polymerization Conditions | | Properties of Product | | Burning Characteristics of String Saturated with Aqueous solution | Shock Characteristics (Struck with Hammer) |
|---|---|---|---|---|---|---|---|---|
| | | | Time Min. | Temp., ° C. | Appreaance | Melting Characteristics, ° C. | | |
| 1 | 0.01 VO–M [1] | $NH_4NO_3$ | 45 | 70–105 | Beads of salts were glued together with polymer. | 155—polymer appeared to melt<br>170—melting<br>175—melting<br>182–190—gassing-decomp. | Burned evenly and slowly. | Stable. |
| 2 | 0.36 VO–M [1] | $NH_4NO_3$ | 32 | 50–100 | Viscous solid | 75—polymer becoming soft.<br>170—melting<br>180—decomp.-gas off.<br>280—gassing<br>292—no more gas, dark brown | ----do---- | Do. |

| Ex. No. | Monomer, Gm. | Salt (0.1 Gm.) | Polymerization Conditions | | Properties of Product | | Burning Characteristics of String Saturated with Aqueous solution | Shock Characteristics (Struck with Hammer) |
|---|---|---|---|---|---|---|---|---|
| | | | Time Min. | Temp., °C. | Appreaance | Melting Characteristics, °C. | | |
| 3 | 0.66 VO-M [1] | NH₄NO₃ | 17 | 70–105 | Viscous Solid | 82—melting<br>170—melting<br>180—decomp.<br>285—no more gas off. | Burned evenly and slowly. | Stable |
| 4 | 0.02 VO-M [1] | NH₄ClO₄ | 14 | 63–105 | Hard brittle solid | 155—browning up.<br>200—dark brown.<br>250—black.<br>300—char. | Burns spurty and a little less than No. 9. | Explodes. |
| 5 | 0.03 VO-M [1] | NH₄ClO₄ | 15 | 50–105 | Hard solid | 160—fusing, browning.<br>210—fused, black.<br>280—small amount of gas off.<br>300—black char. | ----do---- | Stable |
| 6 | 0.07 VO-M [1] | NH₄NO₃ | 19 | 50–105 | ----do---- | 150—fusing, yellow.<br>250—small amount of gas off.<br>300—black char. | ----do---- | Do. |
| 7 | 0.04 VO-M [2] | NH₄ClO₄ | 20 | 35–105 | Brittle solid | 110—fusing.<br>150—browning, melting.<br>192—slight gassing.<br>240—dark red-brown.<br>282—decomp.<br>300—black char. | Burns like No. 9 | Do. |
| 8 | 0.06 VO-E [3] | NH₄ClO₄ | 17 | 35–105 | ----do---- | 97—fusing.<br>140—yellow, melting.<br>185—fused, brown.<br>250—very sl. gas off.<br>300—black char. | ----do---- | Do. |
| 9 | | NH₄ClO₄ | | | | 300—little change. | Very fast spurty burning. | Do. |
| 10 | | NH₄NO₃ | | | | 195—melting.<br>210—gas off.<br>300—decomp. | Burns evenly and slowly. | |

[1] VO-M poly(vinyl-5-methyloxazolidinone).
[2] VO polyvinyloxazolidinone.
[3] VO-E poly(vinyl-5-ethyloxazolidinone).

The polymers per se have the following combustion enthalpy:

|  | Calories per gram |
|---|---|
| Polyvinyloxazolidinone | 5290 |
| Polyvinylmethyloxazolidinone | 5740 |
| Polyvinylethyloxazolidinone | 6400 |

Further, the densities of the polymers of the present invention compare with the known fuels as illustrated in the following table.

| Polymers of the present invention: | Density at 20° to 25° C. |
|---|---|
| Polyvinyloxazolidinone | 1.339 |
| Polyvinylethyloxazolidinone | 1.185 |
| Polyvinylmethyloxazolidinone | 1.285 |

| Other known fuels: | |
|---|---|
| Paraffins | 0.85 |
| Rubber (natural) | 0.91 |
| Thiokol D | 1.34 |
| Thiokol D4 | 1.39 |
| Thiokol A | 1.60 |

It is thus apparent that the polymers are members of a class of compounds which have suitable physical and chemical properties for use as high energy fuels capable of producing a high volume of low-molecular-weight gases and have myriad other advantages not found in many of the known gas producers which make them desirable for such use.

We claim:

1. A solid rocket fuel composition comprising a solid inorganic oxidizing agent and containing as a fuel-binder a water-soluble polymer consisting of at least 90 percent by weight of a repeating unit having the formula

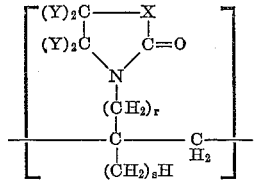

wherein X represents a member selected from the group consisting of
—CH₂—, —O—, —CH₂O— and —O—CH₂—
each Y is independently selected from the group consisting of hydrogen, and lower alkyl radicals having from 1 to 4 carbon atoms, inclusive; $r$ represents an integer from 0 to 2, inclusive; $s$ represents an integer from 0 to 1, inclusive; said polymerization being carried out at a temperature between about 35° and 200° C.

2. A composition as in claim 1 wherein said inorganic oxidizer is ammonium nitrate.

3. A composition as in claim 1 wherein said inorganic oxidizer is ammonium perchlorate.

4. A composition as in claim 1 wherein said fuel-binder is polyvinyloxazolidinone.

5. A compound as in claim 1 wherein said fuel-binder is polyvinylethyloxazolidinone.

6. A compound as in claim 1 wherein said fuel-binder is polyvinylmethyloxazolidinone.

References Cited in the file of this patent

UNITED STATES PATENTS

| 2,818,362 | Dreschel | Dec. 31, 1957 |
| 2,818,399 | Dreschel | Dec. 31, 1957 |
| 2,919,279 | Walles et al. | Dec. 29, 1959 |
| 2,948,656 | Tousignant et al. | Aug. 9, 1960 |
| 2,992,908 | Hedrick et al. | July 18, 1961 |